Feb. 3, 1970     L. H. LIND     3,493,950
APPARATUS FOR DETECTING THE PRESENCE OF AN IONIZABLE FLUID
Filed July 13, 1966
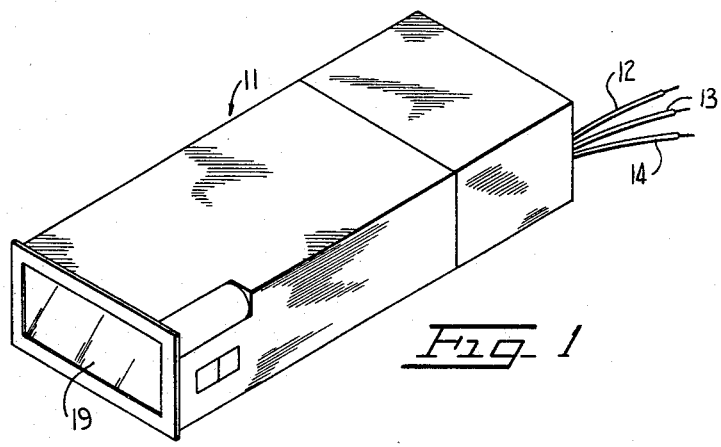
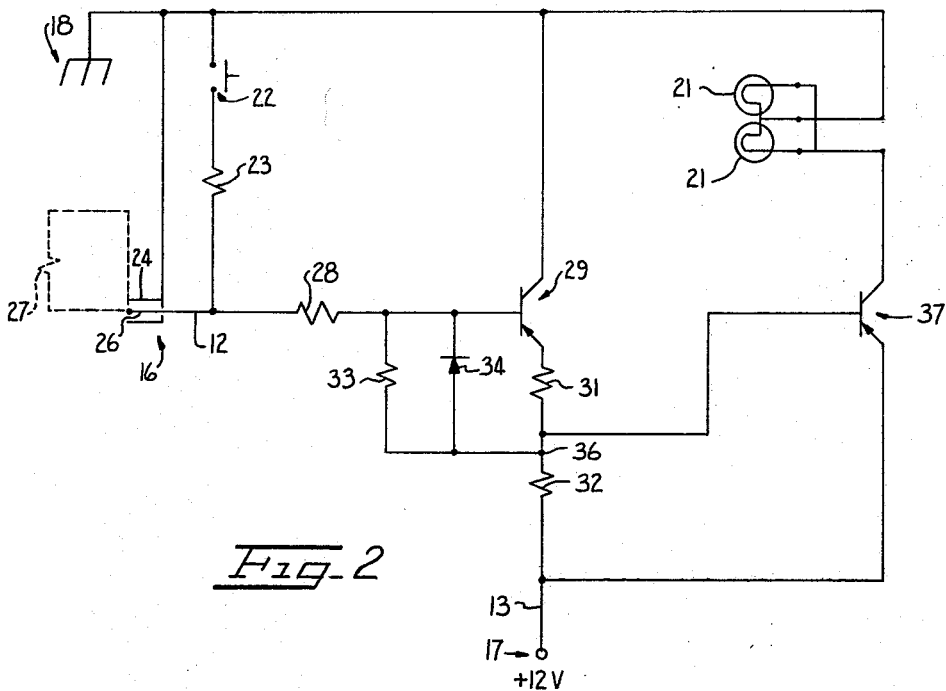
*INVENTOR.*
LARS H. LIND
BY
*Gardner & Zimmerman*
ATTORNEYS

United States Patent Office 3,493,950
Patented Feb. 3, 1970

3,493,950
APPARATUS FOR DETECTING THE PRESENCE OF AN IONIZABLE FLUID
Lars H. Lind, San Leandro, Calif. (% A.I.R. Corporation, Oakland International Airport, Oakland, Calif. 94614)
Filed July 13, 1966, Ser. No. 564,931
Int. Cl. G08b 21/00; E02d 5/04
U.S. Cl. 340—235                         5 Claims

ABSTRACT OF THE DISCLOSURE

Apparatus for detecting the presence in a fuel system or the like of an ionizable fluid such as water is described which is capable of sensing minute quantities of an ionizable fluid with very small sensing currents. The apparatus includes a detecting probe having two electrodes to be bridged by the ionizable liquid to form a conductive path to ground therebetween so as to lower the potential provided by a power source at the base of a transistor connected in common collector configuration with its base coupled to the probe. The lowering of this transistor base potential will rouse the transistor to conduct and thereby lower the base potential of a driver transistor connected in common emitter configuration with its base coupled to the emitter of the first transistor. The emitter-collector path of the driver transistor is connected in series with the power source and a suitable indicator such as a warning light to rouse the power source to energize the indicator upon the potential of the driver transistor being lowered as aforesaid.

---

This invention relates generally to devices for detecting the presence of water or other electrically ionizable fluid in a fuel system, storage vessel, air washing system, or the like, and is more particularly directed to a water detector capable of indicating the presence of extremely minute quantities of water with very low order electrical sensing currents.

In numerous applications it is desirable to provide for the detection of water, or other electrically ionizable liquid, in a system where the presence of any of the liquid or an excessive quantity thereof is a detriment. These applications include the detection of excessive water accumulation in air washing systems, the monitoring of maximum permissable moisture in fibrous or other moisture bearing materials, and the sensing of water level in a storage vessel or a flooding alarm. A particularly important application is the detection of water in an aircraft fuel system where the presence of water in the fuel is a constant threat to reliable and trouble free operation.

Although various water detectors have been devised heretofore for the foregoing and other applications, such detectors have had various disadvantages and limitations. In general, these detectors include a pair of electrodes arranged to be disposed in an environment in which it is desired to detect the presence of water, or other electrically ionizable liquid. The electrodes are connected to an electrical circuit including a power source and indicating means such as lamps, a meter, or the like. When the electrodes are not bridged by water, or another ionizable liquid, the circuit is open and no current flows from the power source to the indicating means. However, when the electrodes are bridged by the water, or other ionizable liquid, a conduction path is formed therebetween which permits current to flow in the circuit. The conduction path between the electrodes is typically of relatively high resistance and therefore limiting upon the amount of current that can flow in the circuit. The current must, of course, be of sufficient magnitude to actuate the indicating means. Sufficient current can be provided by utilizing a relatively high voltage power source. However, in some applications, particularly the detection of water in a fuel system, the use of a high voltage source may present a fire hazard. Alternatively, the resistance of the conduction path through the water, or other ionizable liquid, may be reduced by employing electrodes having relatively large surface areas. Although the sensing current for actuating the indicating means is correspondingly increased, it will be appreciated that a relatively large amount of water, or the like, is required between the enlarged electrode surfaces in order to form the conduction path. Minute quantities of water cannot therefore be detected. Aside from the foregoing disadvantages and limitations of conventional detecting devices, they have generally been rather bulky and expensive.

It is an object of the present invention to provide an improved water detector which is capable of detecting minute quantities of water while yet employing an extremely small sensing current so as to eliminate any possibility of fire hazard when the detector is utilized in a combustible medium.

Another object of the invention is to provide a water detector which is of extremely compact light weight construction.

Still another object of the invention is the provision of a water detector of solid state electronic and modular printed circuit construction.

It is yet another object of the invention to provide a water detector of the class described which features indicating means with a back up indicator to insure against failure of one indicator.

One other object of the invention is the provision of a water detector having an extremely low power consumption.

It is a further object of the invention to provide a water detector of relatively low cost design.

A still further object of the invention is to provide a water detector having a built in push-to-test arrangement for testing the detector for proper operation.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a perspective view of the physical arrangement of the detector.

FIGURE 2 is a schematic circuit diagram of the detector.

Referring now to the drawing, the water detector of the present invention will be seen to be provided as a compact unit including a rectangular housing 11 containing an electronic circuit of a type subsequently described. Solid state electronics and modular printed circuit techniques are employed in the circuit to provide the usual advantages of ruggedness, compactness, light weight, low power consumption, long life, and economy of construction. Leads 12, 13 and 14 extend from the housing to facilitate connection of the circuit respectively to a water detecting probe 16, a voltage supply 17, and ground 18 (see FIGURE 2). A screen 19 is provided at one end of the housing for illumination by at least one indicator lamp 21 mounted therein and associated with the circuit. In this regard, the circuit is so arranged that when the probe 16 does not sense the presence of water, the lamp is deenergized and does not illuminated the screen. When the presence of water is detected by the probe, the lamp is energized and the screen is illuminated through a filter (not shown) to form the words "water in fuel." Various alternative forms of indicating means may be likewise employed in the detector in a similar manner. In order that the detector may be periodically tested for proper operation, the screen 19 is preferably depressible and associated with a push button switch 22 for switching a resistive load 23 into the circuit simulating the probe in the presence of water. When the screen is depressed, the switch is closed and the lamp is energized to illuminate the screen if the detector is operating properly.

Considering now the water detector in more detail with reference to the circuit thereof, as illustrated in FIGURE 2, it is first to be noted that the probe 16 preferably comprises a hollow metallic cylinder 24, of brass or the like, having a conductive wire 26, of for example, stainless steel, mounted therein in insulated relation as by means of porcelain cement. The wire and cylinder thus define electrodes which are normally insulated from each other. The wire 26 is connected to lead 12 while the cylinder 24 is connected to ground 18. When the probe is in a liquid such as gasoline or other fuels which are not electrically ionizable, the wire is insulated from the cylinder such that there is no path for the flow of electrical current therebetween. However, when the wire and cylinder are bridged by an ionizable liquid, such as water in the fuel, a current path represented by the dotted-in resistance 27 is established therebetween. The size of the probe can be made quite small such that as little as a drop of water will bridge the gap between the wire and cylinder and establish a current path.

In order to limit the probe current to a small value, even in the event of a direct short circuit between the wire 26 and cylinder 24, a current limiting resistor 28 is connected in series with the lead 12 which is connected to the wire. This is of importance to insure that the probe current will not constitute a fire hazard when the probe is employed in fuel, or some other combustible medium. The resistor 28 is in turn connected to the base of a transistor 29, which in the illustrated case is of type PNP. The transistor is connected in common-collector configuration in order to provide maximum current gain and therefore a substantial output signal level despite the limited low value of probe current. More particularly, the collector of transistor 29 is connected to ground 18 while the emitter is connected through series voltage dividing and load resistors 31, 32 to the lead 13 which is, in turn connected to the voltage supply 17. In the present case the supply is positive and, for example, of the order of 12 volts. The base of transistor 29 is coupled by the parallel combination of a bias resistor 33 and clamping diode 34 to the common junction 36 between resistors 31, 32. The positive terminal of the diode is connected to the base of the transistor while the negative terminal is connected to the junction 36 in order to protect the transistor against excessive voltage swings.

The output of transistor 29 is taken from the common junction 36 between resistors 31, 32 and directly connected to the base of a driver transistor 37 preferably connected in common-emitter configuration. In the illustrated case of transistor 37 is of type PNP, and the emitter is connected to the voltage supply lead 13. The indicating means, in the present case a pair of the indicator lamps 21 connected in parallel, are connected between the collector of transistor 37 and ground 18. The use of two lamps in parallel provides back-up insurance in the event of failure of one lamp.

To complete the circuit, the simulating load resistance 23 in series with the push button switch 22 are connected between lead 12 and ground 18. The resistance 23 may be thus paralleled with the current path between the wire and cylinder of the probe 16.

With the circuit provided as just described, it will be appreciated that in the absence of an electrically ionizable liquid, such as water, between the wire and cylinder of probe 16, there is no path for current to flow between the voltage supply lead 13 and ground through the resistors 32, 33, 28. The voltage of supply 17 thus appears at the base of transistor 29, and since this voltage is positive the transistor is reverse biased. No current flows in the emitter-collector path of the transistor and consequently the positive voltage of supply 17 appears at the base of transistor 37 to reverse bias same. No current flows in the emitter-collector path of transistor 37, and accordingly the lamps 21 are not energized.

In the presence of water, or other electrically ionizable liquid between the wire and cylinder of the probe 16, a current path is established therebetween and the resistance 27 thereof completes a circuit to ground 18. Current now flows from voltage supply 17 to ground through resistors 32, 33, 28 and resistance 27. The voltage at the base of transistor 29 is rendered less positive than the voltage at the emitter thereof and the transistor is thus forward biased. Current flow in the emitter-collector path of the transistor further decreases the voltage at junction 36 to a value substantially less positive than that of the supply 17. Transistor 37 is thus forward biased and rendered heavily conducting to energize the lamps 21. Since the emitter-collector drop of a transistor is negligible when it is heavily conducting, substantially the entire voltage of supply 17 is impressed across the lamps. In this manner a substantial indicator current is provided even though the probe current is limited to an extremely low value.

When it is desired to test the circuit to insure its operability, the switch 22 is closed to thereby complete a circuit to ground through resistance 23 and establish current flow through resistors 32, 33, 28. The circuit then operates in the manner just described to energize the lamps 21, provided the circuit and lamps are in good operating condition.

Although PNP transistors are employed in the circuit herein illustrated and described, it will be appreciated that NPN transistors may be alternatively employed upon reversing bias connections and other circuit components in a manner well known in the art.

What is claimed is:

1. A detector for electrically ionizable liquid comprising a probe including a hollow conductive cylinder and a conductive wire mounted in said cylinder in insulated relation thereto, one of said cylinder and said conductive wire connected to ground, a transistor having its collector connected to ground, a current limiting resistor connecting the other of said cylinder and said wire of said probe to the base of said transistor, a voltage dividing resistor connected to the emitter of said transistor, a load resistor connected in series with said voltage dividing resistor, a bias resistor connected between the base of said transistor and the common junction between voltage dividing resistor and load resistor, a second transistor having its base connected to said common junction, indicating means connected between the collector of said second transistor and ground, and a voltage supply connected to said load resistor and the emitter of said second transistor to reverse bias said first and second transistors in the absence of current flow between said wire and said cylinder.

2. A detector according to claim 1, further defined by said indicating means being a plurality of lamps connected in parallel.

3. A detector according to claim 2, further defined by a clamping diode connected in parallel with said bias resistor.

4. A detector according to claim 2, further defined by a simulating resistor and a switch connected in series with the wire of said probe and ground.

5. A detector according to claim 2, further defined by said transistor being of type PNP and said voltage supply having a positive polarity.

References Cited

UNITED STATES PATENTS

| | | | |
|---|---|---|---|
| 3,242,473 | 3/1966 | Shivers et al. | 340—235 XR |
| 3,252,420 | 5/1966 | Sorenson. | |
| 3,288,102 | 11/1966 | Reagan et al. | 331—66 XR |
| 3,290,589 | 12/1966 | Hubbard | 324—62 |
| 3,264,557 | 8/1966 | Heeps | 324—65 |

JOHN W. CALDWELL, Primary Examiner

D. MYER, Assistant Examiner

U.S. Cl. X.R.

73—61.1; 324—65; 340—244